United States Patent
Landis et al.

(10) Patent No.: US 9,222,012 B2
(45) Date of Patent: Dec. 29, 2015

(54) METHODS FOR STRENGTHENING SMECTITE SHALE IN HIGHWALL MINES

(71) Applicant: Halliburton Energy Services, Inc., Houston, TX (US)

(72) Inventors: Charles R. Landis, Houston, TX (US); Thomas S. Cortner, Houston, TX (US); Eric B. Frantz, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/873,471

(22) Filed: Apr. 30, 2013

(65) Prior Publication Data

US 2014/0321925 A1  Oct. 30, 2014

(51) Int. Cl.
*E21C 47/00* (2006.01)
*C09K 8/56* (2006.01)
*C09K 8/035* (2006.01)

(52) U.S. Cl.
CPC .. *C09K 8/56* (2013.01); *C09K 8/035* (2013.01)

(58) Field of Classification Search
CPC .......................................................... E21C 47/00
USPC ........................................................... 405/263
See application file for complete search history.

(56) References Cited

U.S. PATENT DOCUMENTS

| | | | |
|---|---|---|---|
| 4,038,181 A | | 7/1977 | Talbert |
| 4,828,726 A | * | 5/1989 | Himes et al. ............... 507/240 |
| 4,952,544 A | * | 8/1990 | McCauley ................... 502/68 |
| 4,957,889 A | * | 9/1990 | McCauley ................... 502/65 |
| 4,980,047 A | * | 12/1990 | McCauley ................... 208/112 |
| 5,059,568 A | * | 10/1991 | McCauley ................... 502/65 |
| 6,497,283 B1 | | 12/2002 | Eoff et al. |
| 6,660,693 B2 | * | 12/2003 | Miller et al. ................ 507/136 |
| 6,743,288 B2 | | 6/2004 | Eoff et al. |
| 6,822,061 B2 | | 11/2004 | Eoff et al. |
| 8,376,045 B2 | | 2/2013 | Sarap et al. |
| 2007/0277973 A1 | | 12/2007 | Dorgan |
| 2009/0308599 A1 | * | 12/2009 | Dusterhoft et al. .......... 166/249 |
| 2011/0259588 A1 | | 10/2011 | Ali et al. |
| 2012/0000654 A1 | * | 1/2012 | Justice ........................ 166/285 |

FOREIGN PATENT DOCUMENTS

WO   2014179112 A1   11/2014

OTHER PUBLICATIONS

SPE 4232, "Stabilizing Sensitive Shales with Inhibited Potassium-Based Drilling Fluids," Journal of Petroleum Technology, pp. 1089-1100, 1973.
Product Data Sheet entitled Clay Grabber® Shale Stabilizer, 2010.
Halliburton Brochure entitled Stabilize Water-Sensitive Clays to Increase Sand Permeability for Improved Well Productivity, Cla-Web™ Clay Damage Control Additive, 2011.

(Continued)

*Primary Examiner* — Tara M. Pinnock
(74) *Attorney, Agent, or Firm* — McDermott Will & Emery LLP; Holly Soehnge

(57) ABSTRACT

Stabilizing smectite shale may include treating a smectite shale in a subsurface formation with a dewatering fluid so as to yield a stabilized smectite shale, the dewatering fluid comprising an aqueous base fluid and a dewatering additive. In some instances, at least a portion of a highwall in a highwall mine may be formed at a highwall mine site comprising stabilized smectite shale.

8 Claims, 3 Drawing Sheets

(56) References Cited

OTHER PUBLICATIONS

Halliburton Brochure entitled Cla-Sta® XP Clay-Stabilizing Agent, 2008.
Halliburton brochure entitled Cla-Sta® FS Additive Mineral Fines and Clay-Stabilizing Additive, 2008.
Dalrymple et al., Relative Permeability Modifiers for Improved Oil Recovery: a Literature Review, 5th Intl. Conference on Reservoir Conformance Profile Control—Water and Gas Shutoff in Houston, Nov. 8-10, 1999.
Marshall, C.E., "Layer Lattices and Base-Exchange Clays," Z. Krist, 91, 433-449, 1935.
Hendricks, S.B., "Lattice Structure of Clay Minerals and Some Properties of Clays," J. Geol., 50, 276-290, 1942.
O'Brien et al., "Stabilizing Sensitive Shales with Inhibited, Potassium-Based Drilling Fluids," J. Pet. Tech., v. 25(5), 1089-1100, 1973.
Hendricks et al., "Hydration Mechanism of the Clay Mineral Montmorillonite Saturated with Various Ions," J. Am. Chem. Soc., 62, 1457-1464, 1940.
Wear et al., "Potassium Fixation in Clay Minerals as Related to Crystal Structures," Soil Sci., 71, 1-14, 1951.
Page et al., "Ionic Size in Relation to Fixation of Cations by Colloidal Clay," Sol. Sci. Soc. Am. J, 4, 150-155, 1939.
Darley, et al., Composition and Properties of Drilling Fluids, 6th ed.; Gulf Professional Publishing, Houston, 1998, pp. 150-151.
Grim, R.E., "Clay Mineralogy," 2nd ed.; McGraw-Hill; New York, 1968, 212-217.
SPE 50712, "How do Anions in Water-Based Muds Affect Shale Stability?" Soc. of Petroleum Eng., 1999, pp. 1-13.
Maegdefrau et al., "Die Kristallstruktur des Montmorillonits," Z. Krist, 98:299-323, 1937.
International Search Report and Written Opinion for PCT/US2014/034937 dated Aug. 21, 2014.

* cited by examiner

METHODS FOR STRENGTHENING SMECTITE SHALE IN HIGHWALL MINES

BACKGROUND

The present invention relates to methods for stabilizing smectite shale in highwall mining applications.

Highwall mining is one of many methods of surface and subsurface mining used for the extraction of valuable materials such as coal, gold, silver, and other minerals from the earth. Generally, highwall mining involves boring into a highwall of a large pit to extract these materials from a seam. In some instances, the mine may have been mined at different levels (e.g., digging new pits inside pits that have been mined) such that a bench area allows for moving equipment in and out of the newer, deeper pit. Further, having bench areas guards against highwalls becoming too high and unstable. The highwalls are typically high and at a very steep slope, e.g., vertical to about 20% off vertical. FIG. 1 illustrates a highwall mine 100 cross-section having two highwalls 102 with a bench area 104 therebetween, a pit surface 106, and the earth surface 108.

Within highwall mines, the lithology, and consequently the highwall lithology, has volumes that predominantly comprise smectite shale. Highwall mines are typically formed or excavated in areas with a heterogeneous lithology with volumes of smectite shale dispersed therethrough. Consequently, the highwalls have multiple lithologies with portions being smectite shale. Smectite shale is a family of clays that consist of clay platelets having an alumina sheet disposed between two silica sheets, commonly referred to as a 2:1 configuration. Smectite shales are known for swelling caused by water intercalating between the platelets thus expanding the interlayer spacing between the platelets.

Water swollen smectite shale has a lower strength and is believed to be prone to landslides. Heavy rain can exacerbate the landslide risk by saturating the smectite shale. Additionally, the water between the clay platelets may undergo phase changes between ice and water depending on the external temperature of the surrounding environment, which can further destabilize the shale as a result of the size difference between ice and water (i.e., ice crystals have a larger volume than water).

Major wall failures (e.g., landslides, which are often originate with the smectite shale) can occur seemingly without warning, causing loss of lives, damage to equipment, and disruption to the mining process. Efforts to prevent landslides and other major wall failures include highwall strengthening technologies. These may include mechanical stabilization (e.g., with rocks, cement, grout, and concrete) and/or drainage to mitigate erosion. These strengthening technologies are often costly to put into place. Additionally, if an operator needs to move a highwall or dig into a highwall (e.g., to retrieve minerals), these strength technologies are costly and time consuming to deconstruct and reconstruct. Further, these strengthening technologies are preventative measures only and do not address the underlying mineralogy that is most prone to landslides.

SUMMARY OF THE INVENTION

The present invention relates to methods for stabilizing smectite shale in highwall mining applications.

One embodiment of the present invention provides for a method that includes providing a stabilized smectite shale in a subsurface formation, wherein the stabilized smectite shale is a smectite shale treated with a dewatering fluid, the dewatering fluid comprising an aqueous base fluid and a dewatering additive; and forming at least a portion of a highwall in a highwall mine, the highwall comprising the stabilized smectite shale.

Another embodiment of the present invention provides for a method that includes treating a highwall in a highwall mine, the highwall comprising a smectite shale, with a dewatering fluid so as to yield a stabilized smectite shale.

Yet another embodiment of the present invention provides for a method that includes treating a smectite shale in a subsurface formation with a dewatering fluid so as to yield a stabilized smectite shale, the dewatering fluid comprising an aqueous base fluid and a dewatering additive; forming at least a portion of a highwall in a highwall mine, the highwall comprising the stabilized smectite shale; and mining a minable material at the highwall mining site.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
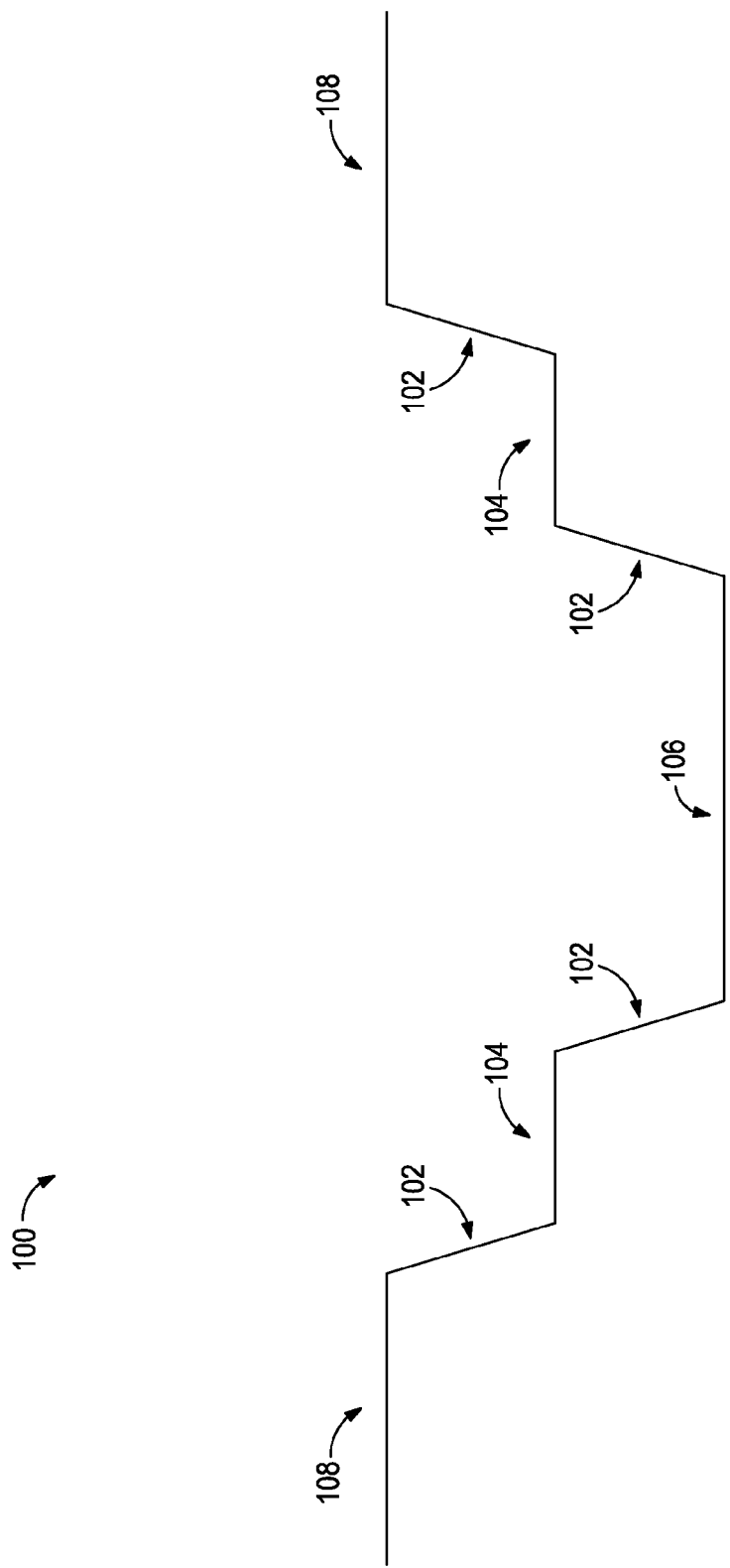
FIG. 1 provides an illustrative cross-section of a highwall mine.

The present invention relates to methods for stabilizing smectite shale in highwall mining applications.

The methods described herein involve stabilizing the smectite shale, for example, in some embodiments, with a dewatering fluid, so as to yield a stabilized smectite shale. Without being limited by theory, it is believed that the amount of water present in the smectite shale is dependent on the cations associated with the clay platelets. Therefore, a dewatering fluid comprising a cation that has a lower hydration and associates strongly with the clay platelets may be capable of replacing existing cations and their hydration, thereby yielding a dewatered smectite shale. Dewatered smectite shale (also referred to herein as "stabilized smectite shale") may advantageously have a higher shear strength than the original smectite shale, which in the context of highwall mining may yield stronger, more stable highwalls and/or steeper angle highwalls. This may aid in the prevention of landslides and other major collapses, especially of highwalls. It should be noted that, as used herein, the term "dewater" does not indicate or imply a 100% reduction in water within a clay structure.

The dewatering fluids described herein may comprise dewatering additives with high binding energies to the smectite shale that are not easily lost or replaced, for example after exposure to heavy rains, thereby mitigating the risk of landslides. Additionally, the dewatering of the smectite shale is believed to reduce the water between the clay platelets, which in turn mitigates the effect of water phase changes in freeze/thaw conditions. Accordingly, stabilization of the smectite shale may reduce the risk to workers and equipment, and consequently increase productivity and profitability of the highwall mine.

Further, the dewatering fluids described herein provide for methods of stabilizing smectite shale, and consequently highwalls that comprise such clays, that may be more effective than the current mechanical stabilization methods often employed. The methods described herein may also be more cost-effective, and potentially, faster. Further, the methods described herein may not need to be remediated to dig into or move the location of the highwall as mechanical stabilization like cementing would require.

It should be noted that when "about" is provided herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

Some embodiments may involve treating a smectite shale with a dewatering fluid so as to yield a stabilized smectite shale, wherein treating the smectite shale may occur before, after, and/or during the formation of a highwall in a highwall mine. For example, some embodiments may involve treating a smectite shale in a subsurface formation with a dewatering fluid so as to yield a stabilized smectite shale; and forming at least a portion of a highwall in a highwall mine, the highwall comprising the stabilized smectite shale. In another example, some embodiments may involve treating a highwall in a highwall mine, the highwall comprising a smectite shale, with a dewatering fluid so as to yield a stabilized smectite shale. Some embodiments may further involve mining a minable material (e.g., coal, gold, silver, and other minerals from the earth) from the highwall mine.

In some embodiments, treating the smectite shale may involve introducing the dewatering fluid into the smectite shale via an injection well. In some embodiments, the water released from the smectite shale and/or residual dewatering fluid may be collected at a water well, which may be proximal to the injection well. In some embodiments, the water released from the smectite shale and/or residual dewatering fluid may be collected at the injection well. In some embodiments, the water released from the smectite shale and/or residual dewatering fluid may be collected via drainage pipe in the highwall. In some embodiments, the water released from the smectite shale and/or residual dewatering fluid may be collected passively utilizing fractures in the ground (e.g., induced fractures, natural fractures, or networks thereof).

The water well and/or the injection well may, in some embodiments, be at any angle, e.g., vertical, deviated, highly deviated, horizontal, and hybrids thereof comprising sections of any combination of the aforementioned wells. As used herein, the term "deviated" refers to a wellbore in which any portion of the well is oriented between about 55-degrees and about 125-degrees from a vertical inclination. As used herein, the term "highly deviated" refers to a wellbore that is oriented between about 75-degrees and about 105-degrees off-vertical.

The water well and/or the injection well may, in some embodiments, have a well site (i.e., the entry point into the earth or subsurface formation) anywhere within or proximal to the highwall mine.

Figure 2:
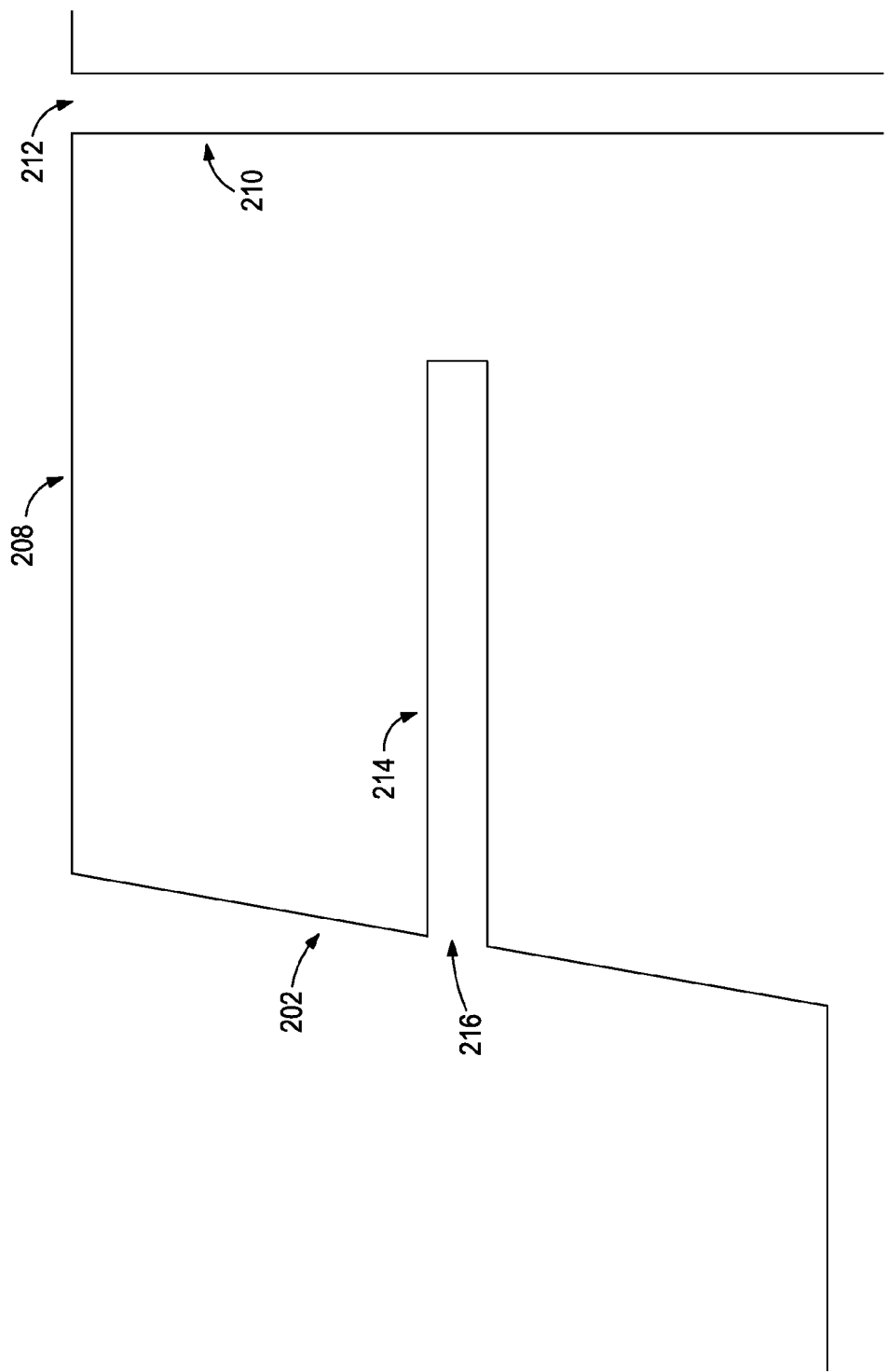
FIG. 2 provides an illustrative cross-section of a portion of highwall mine including an injection well and a water well.
Figure 3:
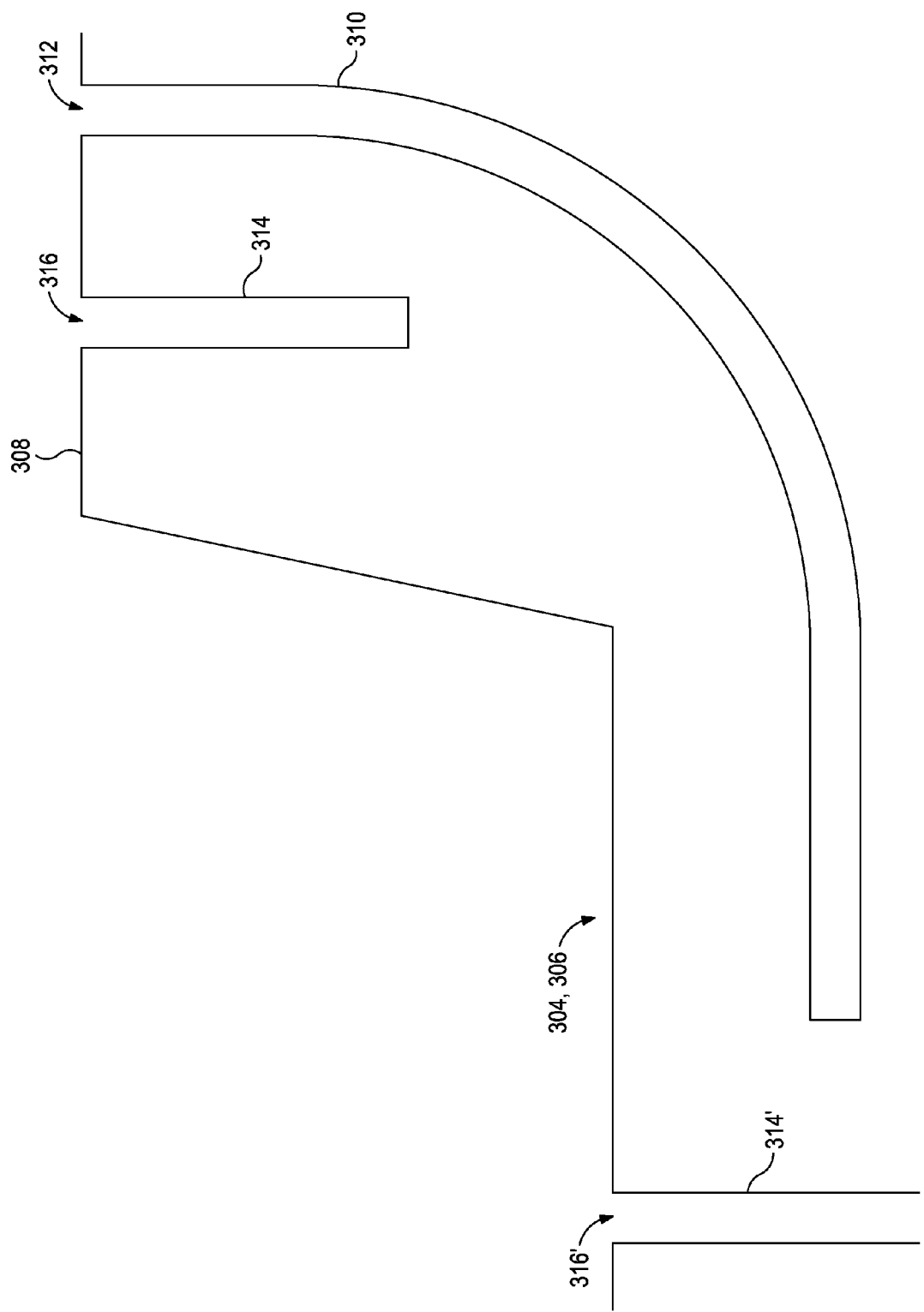
FIG. 3 provides an illustrative cross-section of a portion of highwall mine including an injection well and two water wells.

For example as illustrated in FIG. 2, an injection well 210 may be vertical with a well site 212 in the earth surface 208, while the water well 214 may be horizontal with a well site 216 into highwall 202. In another example illustrated in FIG. 3, an injection well 310 may be deviated with a well site 312 in the earth surface 308, while there may be two water wells 314,314' where water well 314 is vertical with a well site 316 in the earth surface 308 and water well 314' is vertical with a well site 316' in a bench area 304 or the pit surface 306.

Dewatering fluids described herein may, in some embodiments, comprise an aqueous base fluid and a dewatering additive. In some embodiments, dewatering additives may comprise at least one of cationic oligomers, cationic polymers, nonionic N-containing oligomers, nonionic N-containing polymers, potassium salts, ammonium salts, iron salts, aluminum salts, phosphonium salts, acids, and any combination thereof.

Aqueous base fluids suitable for use in the dewatering fluids described herein may comprise fresh water, saltwater (e.g., water containing one or more salts dissolved therein), brine (e.g., saturated salt water), seawater, and any combination thereof. Generally, the water may be from any source, provided that it does not contain components that might adversely affect the stability and/or performance of the dewatering additive described herein.

Examples of cationic oligomers (e.g., compounds with less than about 5 monomeric units) and cationic polymers may include, but are not limited to, those with at least one monomeric unit of alkylene imine, ethylene imine, propylene imine, amine, ethylene amine, an organo-amine, quaternized amine, acrylamides, methacrylamide, putresine, cadaverine, spermidine, spermine, diethylenetriamine, tetramethylenediamine, triethylenetetramine, tetraethylenepentamine, diallyldimethylammonium chloride (DADMAC), (2-methacryloyloxyethyl) trimethyl ammonium chloride (DMC), and the like, any derivative thereof, any salt thereof, and any combination thereof. In some embodiments, a cationic polymer may be a copolymer including at least one of the foregoing monomeric units. As used herein, the term "copolymer" encompasses block copolymers, random copolymers, comb copolymers, blend polymers, graft copolymers, star or dendritic polymers, terpolymers, and the like.

Examples of nonionic N-containing oligomers and nonionic N-containing polymers may include, but are not limited to, those with at least one monomeric unit of vinylpyrrolidone, acrylamide, methacrylamide, amine, imine, and the like, any derivative thereof, and any combination thereof. In some embodiments, a nonionic N-containing polymer may be a copolymer including at least one of the foregoing monomeric units.

Examples of salts (e.g., potassium salts, ammonium salts, iron salts, aluminum salts, and phosphonium salts) may, in some embodiments, be salts that include a counterion like fluoride, chloride, chlorate, bromide, iodide, iodate, acetate, citrate, oxalate, formate, nitrate, phosphate dibasic, phosphate monobasic, sulfate, bisulfite, carbonate, dichromate, ferrate, and the like, and any combination thereof.

Examples of acids suitable for use in conjunction with dewatering additives may include, but are not limited to, hydrochloric acid, hydrochloric acid, nitric acid, phosphoric acid, sulfuric acid, acetic acid, formic acid, lactic acid, citric acid, and the like, any derivative thereof, and any combination thereof.

In some embodiments, a dewatering additive may be present in a dewatering fluid in an amount ranging from a lower limit of about 0.01%, 0.1%, 1%, or 2% by weight of the aqueous base fluid to an upper limit of about 10%, 7%, 5%, or 2% by weight of the aqueous base fluid, wherein the amount of dewatering additive may range from any lower limit to any upper limit and encompasses any subset therebetween. For example, the dewatering additive may comprise potassium citrate and potassium nitrate each independently at a concentration of about 0.5% to about 5% by weight of the aqueous base fluid.

Embodiments disclosed herein include:
A. a method that includes providing a stabilized smectite shale in a subsurface formation, wherein the stabilized smectite shale is a smectite shale treated with a dewatering fluid, the dewatering fluid comprising an aqueous base fluid and a dewatering additive; and forming at least a portion of a highwall in a highwall mine, the highwall comprising the stabilized smectite shale;
B. a method that includes treating a highwall in a highwall mine, the highwall comprising a smectite shale, with a dewatering fluid so as to yield a stabilized smectite shale; and
C. a method that includes treating a smectite shale in a subsurface formation with a dewatering fluid so as to yield a stabilized smectite shale, the dewatering fluid comprising an aqueous base fluid and a dewatering additive; forming at least a portion of a highwall in a highwall mine, the highwall comprising the stabilized smectite shale; and mining a minable material at the highwall mining site.

Each of embodiments A, B, and C may have one or more of the following additional elements in any combination: Element 1: the dewatering additive comprising at least one selected from the group consisting of a cationic oligomer, a potassium salt, an ammonium salt, an iron salt, an aluminum salt, a phosphonium salt, an acid, and any combination thereof; Element 2: the dewatering additive comprising a cationic oligomer that comprises at least one monomer selected from the group consisting of alkylene imine, ethylene imine, propylene imine, amine, ethylene amine, an organo-amine, quaternized amine, acrylamide, methacrylamide, putresine, cadaverine, spermidine, spermine, diethylenetriamine, tetramethylenediamine, triethylenetetramine, tetraethylenepentamine, diallyldimethylammonium chloride, (2-methacryloyloxyethyl) trimethyl ammonium chloride, any derivative thereof, any salt thereof, and any combination thereof; Element 3: the dewatering additive comprising a cationic oligomer that comprises at least one monomer selected from the group consisting of vinylpyrrolidone, acrylamide, methacrylamide, amine, imine, any derivative thereof, and any combination thereof; Element 4: the dewatering additive comprising a potassium salt that comprises at least one selected from the group consisting of potassium fluoride, potassium chloride, potassium chlorate, potassium bromide, potassium iodide, potassium iodate, potassium acetate, potassium citrate, potassium formate, potassium nitrate, potassium phosphate dibasic, potassium phosphate monobasic, potassium sulfate, potassium bisulfate, potassium carbonate, potassium dichromate, potassium ferrate, and any combination thereof; Element 5: the dewatering additive comprising an acid that comprises at least one selected from the group consisting of hydrochloric acid, hydrochloric acid, nitric acid, phosphoric acid, sulfuric acid, acetic acid, formic acid, lactic acid, citric acid, any derivative thereof, and any combination thereof; Element 6: the dewatering additive being present in a concentration of about 0.01% to about 10% by weight of the aqueous base fluid; Element 7: the dewatering additive comprising potassium citrate and potassium nitrate each independently in a concentration of about 0.5% to about 5% by weight of the aqueous base fluid; Element 8: wherein treating the smectite shale involves introducing the dewatering fluid into the smectite shale via an injection well; Element 9: wherein treating the smectite shale involves introducing the dewatering fluid into the smectite shale via an injection well that comprises a well site in at least one selected from the group consisting of an earth surface, the highwall, a second highwall, a bench area, and a pit surface; Element 10: wherein treating the smectite shale involves introducing the dewatering fluid into the smectite shale via an injection well that is deviated; Element 11: the method further including collecting a water released from the smectite shale via a water well proximal to an injection well, wherein treating the smectite shale involves introducing the dewatering fluid into the smectite shale via the injection well; Element 12: the method further including collecting a water released from the smectite shale via a water well proximal to an injection well, wherein treating the smectite shale involves introducing the dewatering fluid into the smectite shale via the injection well, and wherein the water well comprises a well site in at least one selected from the group consisting of an earth surface, the highwall, a second highwall, a bench area, and a pit surface; and Element 13: the method further including mining a minable material at the highwall mining site.

By way of non-limiting example, exemplary combinations applicable to A, B, C include: any one of Elements 1-5 in combination with Element 6; any one of Elements 8-12 in combination with any of the preceding combinations; Element 13 in combination with any one of the preceding combinations; any one of Elements 8-12 in combination with Element 7; and Element 13 in combination with Element 7.

The exemplary dewatering fluids disclosed herein may directly or indirectly affect one or more components or pieces of equipment associated with the preparation, delivery, recapture, recycling, reuse, and/or disposal of the disclosed dewatering fluids. For example, the disclosed dewatering fluids may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary dewatering fluids. The disclosed dewatering fluids may also directly or indirectly affect any transport or delivery equipment used to convey the dewatering fluids to a mine site or related site (e.g., an injection well) such as, for example, any transport vessels, conduits, pipelines, trucks, tubulars, and/or pipes used to fluidically move the dewatering fluids from one location to another, any pumps, compressors, or motors (e.g., topside or downhole) used to drive the dewatering fluids into motion, any valves or related joints used to regulate the pressure or flow rate of the dewatering fluids, and any sensors (i.e., pressure and temperature), gauges, and/or combinations thereof, and the like. The disclosed dewatering fluids may also directly or indirectly affect the various mining and/or downhole equipment and tools that may come into contact with the dewatering fluids such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, miners, and the like.

To facilitate a better understanding of the present invention, the following examples of preferred or representative embodiments are given. In no way should the following examples be read to limit, or to define, the scope of the invention.

EXAMPLES

Example 1

A dewatering fluid was prepared with 2 wt % potassium nitrate and 2 wt % potassium citrate. A series of shale samples were placed in a cell and saturated with the dewatering fluid at 65 psi for 3 days. Then the shale samples were flushed with the dewatering fluid at 65 psi for 6 days. The resultant dewatered shale samples were allowed to dry at room temperature until reaching a steady state moisture content of 18%. The samples were then tested along with a control of untreated shale according to the ASTM Standard Test Method for Direct Shear Test of Soils Under Consolidated Drained Conditions.

Under an effective normal pressure of 4.17 ksf (kilopounds per square foot), the dewatered shale failed at a higher shear stress (4.73 ksf) than the control sample (2.74 ksf). That is, the treated sample showed a nearly two-fold higher resistance to failure by shearing forces than the untreated sample at the same normal stress, which illustrates the potential efficacy of the methods described herein to stabilize smectite shale and the corresponding highwalls in surface mining applications.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   treating a highwall in a highwall mine, the highwall comprising a smectite shale, with a dewatering fluid so as to yield a stabilized smectite shale, wherein the dewatering fluid comprises an aqueous base fluid and a dewatering additive that comprises potassium citrate and potassium nitrate each independently in a concentration of about 0.5% to about 5% by weight of the aqueous base fluid.

2. The method of claim 1 further comprising: treating the smectite shale by introducing the dewatering fluid into the smectite shale via an injection well.

3. The method of claim 2, wherein the injection well comprises a well site in at least one selected from the group consisting of an earth surface, the highwall, a second highwall, a bench area, and a pit surface.

4. The method of claim 2, wherein at least a portion of the injection well is deviated.

5. The method of claim 2, wherein a water is released from the smectite shale as a result of treating the smectite shale with the dewatering fluid, and the method further comprising:
   collecting the water released from the smectite shale via a water well proximal to the injection well.

6. The method of claim 5, wherein the water well comprises a well site in at least one selected from the group consisting of an earth surface, the highwall, a second highwall, a bench area, and a pit surface.

7. The method of claim 1 further comprising:
   mining a minable material at the highwall mining site.

8. A method comprising:
   treating a smectite shale in a subsurface formation with a dewatering fluid so as to yield a stabilized smectite shale, the dewatering fluid comprising an aqueous base fluid and a dewatering additive that comprises potassium citrate and Potassium nitrate each independently in a concentration of about 0.5% to about 5% by weight of the aqueous base fluid;
   forming at least a portion of a highwall in a highwall mine, the highwall comprising the stabilized smectite shale of the subsurface formation; and
   mining a minable material at the highwall mining site.

* * * * *